April 23, 1968   M. W. GUSTAFSON   3,379,077
RADIAL ADJUSTMENT MEANS FOR CUTTING TOOLS
Filed March 8, 1967
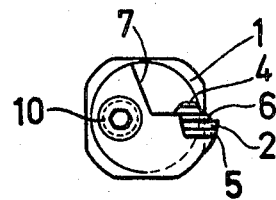
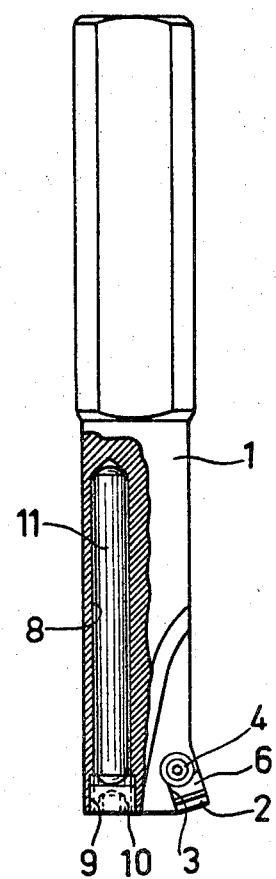
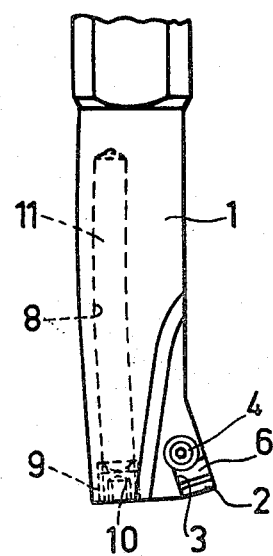
INVENTOR
MANFRED WALLACE GUSTAFSON
BY
HIS ATTORNEYS

United States Patent Office 3,379,077
Patented Apr. 23, 1968

3,379,077
RADIAL ADJUSTMENT MEANS
FOR CUTTING TOOLS
Manfred Wallace Gustafson, Fagersta, Sweden, assignor to Fagersta Bruks Aktiebolag, Fagersta, Sweden, a joint-stock company of Sweden
Filed Mar. 8, 1967, Ser. No. 621,676
Claims priority, application Sweden, Mar. 10, 1966, 3,173/66
5 Claims. (Cl. 77—58)

ABSTRACT OF THE DISCLOSURE

A means for making fine radial adjustments of an internal cutting or boring tool in which the tool holder has a longitudinally extending bore adjacent the cutting tool end and offset from its center diametrically opposite the cutting tool. A rod of somewhat smaller diameter than the bore and with rounded ends is retained in the bore. An adjusting screw closes the bore at the cutting tool end and bears against the corresponding rounded end of the rod. Tightening of the screw causes slight bending of the rod and the tool holder to effect a fine adjustment of the radial position of the cutting tool.

---

This invention relates to an arrangement for the radial fine adjustment of the position for the cutting edge of a cutting member at internal working wherein the cutting member is maintained clamped in a lateral recess at the front end of a holder body by a clamping device.

This type of tool is mainly utilized for the internal turning of holes in automatic lathes and turret lathes. In many cases the tool used is a special tool which is intended only for a special working piece. To a large extent the holes must be worked with high tolerance requirements, for example with the tolerance degree IT6. It is, therefore, necessary to be able to finely adjust the position of the cutting edge in the radial direction, because in said machines the tool holder cannot be moved in a direction radial to the working piece.

Generally a drilling rod with a so-called built-in holder is applied which can be moved in the radial direction by means of an adjusting screw. The front end of the tool holder where the cutting edge is placed rests via the adjusting screw against the drill rod, which arrangement is unsatisfactory from a stability point of view. The built-in holder, moreover, requires much space and cannot be used for the working of smaller hole diameters.

The aforesaid disadvantages are eliminated by an arrangement according to the invention which substantially is characterized in that the holder body comprises a hole extending from said end perferably in parallel with the longitudial axis of the holder body, a rod-shaped member being provided in the hole and a clamping device mounted at the outer end of the hole, which clamping device is adapted to be pressed with an adjustable pressure against the rod shaped member.

The invention is described to a greater detail in the following, reference being had to the accompanying drawing showing an embodiment of the invention.

FIGURES 1 and 2 show a horizontal view and an end view respectively of a holder with a cutting member and an arrangement according to the invention for radially adjusting the cutting edge, the arrangement in FIGURE 1 being shown in a section through the holder. FIGURE 3 shows in a plane view a holder position curved outwards in relation to the position shown in FIGURE 1, the curvature, however, being drawn exaggerated for the sake of greater clearness.

In the embodiment shown a tool holder 1 is provided at its front end with a cutting member 2 preferably designed as an indexable insert which is mounted in a lateral recess 3 and clamped by a clamping device 4 on a sole 5. A chip breaking plate 6 is placed between the clamping device and the cutting member. The front portion of the holder also comprises a lateral recess 7 of a greater size, the bottom of which lies in a plane through the longitudinal axis of the holder body and constitutes the space for the chip removal and clamping means. The lateral recesses shown, of course, and also the cutting member and the clamping device have a different shape.

The end of the holder body 1 comprises a circular hole 8 having a closed bottom and an open outer end which is in parallel with the longitudinal axis of the holder body and laterally off-set the same. The hole is spaced on that side of the holder body which is opposite to the side where the cutting member 2 is located and, as shown, preferably diametrically opposite. The outer portion of the hole 8 is provided with a thread for threaded engagement with a screw 10.

In the hole 8 a round rod 11 is placed which is shaped such that the screw 10 can press against the same. The screw, as shown, presses against a spherical end of the rod. The diameter of the rod is somewhat smaller than the hole diameter. The rod is made of iron, metal or the like, but preferably of the same material as the holder body 1.

Upon its tightening the screw 10 is passed against the rod 11. The resulting tensile stress in the material of the holder body brings about an elongation of that holder body portion where the rod is located. Hereby the holder body is curved to the direction of the cutting member 2, in such a manner as shown exaggerated in FIGURE 3. For a certain sizes of this curvature the hole diameter made at the working is increased twice as much. With a suitably selected pitch of the screw, the curvature can be adjusted without difficulty within 0.005 mm., so that the diameter of the hole can be changed easily within 0.01 mm.

The invention, of course, is not restricted to the aforedescribed embodiment, but can be varied in several ways within the scope of the following claims. Thus, for example, the hole in the holder body and the rod placed therein may have a shape different of that shown and described. Instead of a screw for effecting an adjustable pressure against the rod also another suitable clamping device can be mounted.

I claim:
1. A fine adjustment tool holder for a cutting member for internal working comprising a holder body having a lateral recess at one end and a hole having an open outer end and a bottom extending lengthwise of the body substantially parallel with and offset laterally from the longitudinal axis of said body, means for clamping a cutting member in said lateral recess, a rod-shaped member in said hole abutting said bottom of said hole and a clamping device adjustably mounted on said body at the outer end of said hole for engaging and forcing said rod-shaped member endwise against the bottom of said hole to bend said holder body and displace said cutting member laterally.

2. The tool holder set forth in claim 1 in which the outer end of said hole is threaded and the clamping device comprises a screw threaded in said hole.

3. The tool holder set forth in claim 1 wherein the hole is located diametrically opposite said cutting member.

4. The tool holder set forth in claim 1 wherein the cross-sectional diameter of the rod is somewhat smaller than that of the hole.

5. The tool holder set forth in claim 4 wherein the rod is composed of the same material as the holder body.

References Cited

UNITED STATES PATENTS

| | | | |
|---|---|---|---|
| 1,422,491 | 7/1922 | Stahl | 29—97.5 |
| 1,470,289 | 10/1923 | Rachard | 29—98 |

GERALD A. DOST, *Primary Examiner.*